United States Patent [19]

Kameya et al.

[11] 4,265,937
[45] May 5, 1981

[54] METHOD FOR PRODUCING A COLORED REFLECTIVE PLATE HAVING EXCELLENT DURABILITY AND FABRICABILITY

[75] Inventors: Toru Kameya, Ichikawa; Shinichi Makino, Narashino; Masayuki Tsuruta, Ichikawa, all of Japan

[73] Assignee: Taiyo Steel Co., Ltd., Tokyo, Japan

[21] Appl. No.: 38,781

[22] Filed: May 14, 1979

[30] Foreign Application Priority Data

Aug. 28, 1978 [JP] Japan ................................ 53-104521

[51] Int. Cl.$^3$ ............................................................ G02B 5/128
[52] U.S. Cl. ...................................... 427/163; 350/105
[58] Field of Search ................ 427/162, 163; 156/277, 156/281, 298; 350/105

[56] References Cited

U.S. PATENT DOCUMENTS

| | | | |
|---|---|---|---|
| 3,573,954 | 4/1971 | Yamamoto ....................... | 427/162 X |
| 4,104,102 | 8/1978 | Eagon et al. ......................... | 427/163 |

*Primary Examiner*—James R. Hoffman
*Attorney, Agent, or Firm*—Wenderoth, Lind & Ponack

[57] ABSTRACT

A colored reflective plate having excellent recurrent reflectivity, durability and fabricability is produced economically with high productivity by subjecting a base plate such as a steel plate, an aluminum plate and a plywood successively to the following treatments: coating and drying a colored paint on the base plate to form a primary colored layer, coating or printing a colored paint on said primary colored layer partially or totally with a thickness in the range from 30 to 80% of the mean radius of glass beads to be coated subsequently thereon, to form an intermediate colored layer, scattering glass beads having a refractive index in the range from 1.9 to 2.1 on the surface of said intermediate layer, removing the excess of glass beads unadhered on said layer, pressing the remaining glass beads in the intermediate colored layer until the beads contact the above mentioned primary colored layer, drying said intermediate layer, further coating a clear paint in the cavities among the glass beads so as to bury the beads in said intermediate and clear paint layers up to a depth from 40 to 80% of the mean diameter of the beads in total after drying, and finally drying and curing the clear paint.

6 Claims, 8 Drawing Figures

METHOD FOR PRODUCING A COLORED REFLECTIVE PLATE HAVING EXCELLENT DURABILITY AND FABRICABILITY

BACKGROUND OF THE INVENTION

The present invention relates to a method for producing a colored recurrent reflective plate having excellent reflectivity, durability and fabricability by using a steel plate, an aluminum plate, a plywood and the like as a base plate, economically with high productivity.

DESCRIPTION OF PRIOR ART

It is a well known fact that a reflective plate has been used as a traffic signal and the like to distinguish letters and figures distinctly, even at night. Almost all the conventional reflective plates have been produced by laminating a reflective sheet comprising a thin synthetic resin film as a base on a steel plate, a plywood and the like, usually printing letters and figures thereon. Said reflective sheets utilize the recurrent reflectivity of highly refractive glass beads. They are plated with metal on their reflective surface, and their reflectivity is excellent, but their production cost is high owing to their low productivity. Moreover, since the thin sheet itself is not a structural body, the reflecting sheet must be laminated to another structural base plate in practical application, increasing the production cost still more owing to the cost of the base plate and the labor for laminating. Therefore, although the reflective sheet has a wide field of application, it is scarcely applied for practical use.

Various inventions have been proposed to produce reflective plates comprising a structural body by covering various kinds of plates directly with glass beads, but all of them have such defects that the reflectivity, the durability and the fabricability are insufficient and the productivity is low, and they cannot be applicable for practical use. Such defects are due to the absence of a satisfactory method for covering the plate with beads. Namely, whereas it is desirous to arrange the beads compactly in a single layer on the base plate for the purpose of ensuring excellent reflectivity, the covering method of the plate with beads to satisfy such a condition is not established. On the other hand, a method is known to cover the surface of beads completely and smoothly with a thick clear paint film to prevent the falling off of the beads and to ensure excellent durability and fabricability, but this method deteriorates the reflectivity.

Figure 1:
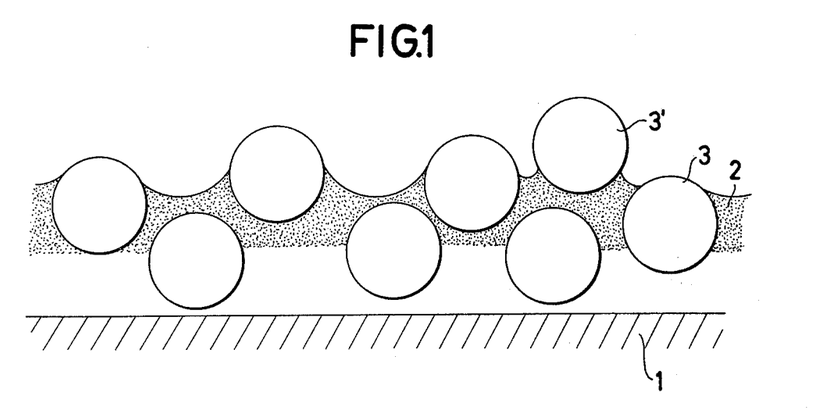
FIG. 1 shows schematically beads scattered by the prior art method.

Conventional coating methods of beads scatter beads on an adhesive layer provided on a base plate, but it is difficult in such a method to arrange beads compactly in a single layer. The reason will be explained according to FIG. 1, in which 1 is a base plate, 2 is an adhesive layer and 3, 3' are glass beads. Adhesive 2 coated on the base plate 1 oozes out through the cavities among the beads 3 in the first layer up to the top of the beads due to the capillary phenomenon, and consequently the beads 3' are ahered in layers thereon.

To solve said problem, the capillary phenomenon has been depressed conventionally by elevating the viscosity of the adhesive extremely. Practically, the adhesive is coated under a usual viscosity, and then the viscosity is elevated by semi-drying, or a high viscosity adhesive is coated from the beginning by using a specified coating apparatus. However, in any of the methods, the process is complicated, the efficiency is low and the operation is difficult. A further method has been proposed to bury the beads forcedly in the adhesive layer by pressing in order to prevent the falling off of the beads, but this method also has such difficulties that the buried thickness is uneven, the beads are piled in layers and the adhesive is forced out through the cavities among beads to adhere to the press machine.

To overcome such difficulties, Japanese Pat. No. Sho 49-33587 proposes to scatter beads on a semi-dried adhesive layer, to dissolve the excess of adhesive by using a solvent and then to press the beads into the adhesive layer, and Japanese Pat. Nos. Sho 45-37595 and Sho 47-1055 propose to coat a paint, in which beads are mixed previously, directly on a base plate. However, the method of Japanese Pat. No. Sho 49-33587 has such a defect that the dissolution of the adhesive needs a long period of time, thus lowering the productivity, although the method can arrange the beads in a single layer. In the latter two methods, in which a paint containing beads is coated, although the beads are buried completely to prevent their falling off, it is difficult to arrange the beads compactly in a single layer, markedly deteriorating the reflectivity.

For the purpose of improving the reflectivity together with the durability and fabricability, it is well known to use glass beads having a refractive index in the range from 2.2 to 2.4, and simultaneously to cover the glass beads with a clear paint layer. However, in such an instance, the film thickness of the clear paint layer must be controlled in accordance with the refractive index and the particle size of the beads, case by case, to meet with the focus position of light, thus complicating the process.

SUMMARY OF THE INVENTION

The present invention is to solve all the defects as above mentioned and to enable the production of a colored reflective plate having excellent recurrent reflectivity, durability and fabricability, economically with a high productivity. The essential point of the invention is, for the purpose of producing a colored reflective plate having excellent recurrent reflectivity, durability and fabricability, to subject a base plate such as a steel plate, an aluminum plate and a plywood successively to the following treatments: coating and drying a colored paint on the base plate to form a primary colored layer, coating or printing a colored paint on said colored layer partially or totally with a thickness in a range from 30 to 80% of the mean radius of glass beads to be coated subsequently thereon, to form an intermediate colored layer, scattering glass beads having a refractive index in a range from 1.9 to 2.1 on the intermediate layer, removing the excess of glass beads unadhered on said layer, pressing the remaining beads in the intermediate layer until the beads contact with the above-mentioned primary colored layer, drying said intermediate layer, further coating a clear paint in the cavities among the glass beads so as to bury the beads in the intermediate and clear paint layer up to a depth from 40 to 80% of the mean diameter of the beads in total after drying, and finally drying and curing the clear paint.

DETAILED DESCRIPTION OF THE INVENTION

Figure 2:
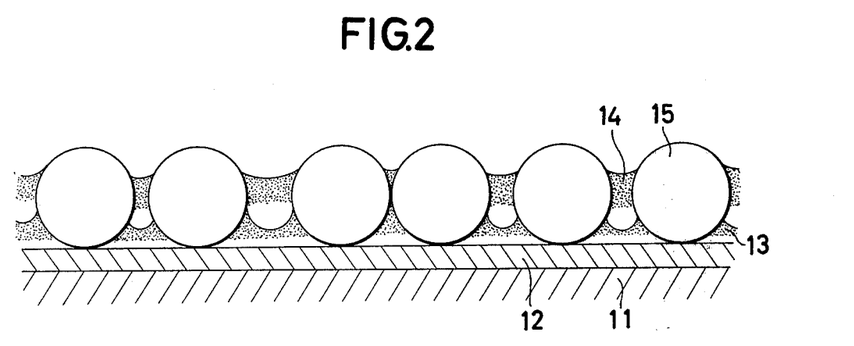
FIG. 2 shows a cross section of the colored reflective plate according to the present invention.

A practical embodiment of the present inventive colored reflective plate will be shown in FIG. 2, in which 11 is a base plate, 12 is a primary colored layer, 13 is an intermediate colored layer, 14 is a clear paint layer and 15 are glass beads.

In the present inventive colored reflective plate, as obvious from the figure, the cavities among the beads are filled with the clear paint film so that the beads are buried in the intermediate and clear paint layers up to 40 to 80% of the mean diameter of the beads in total after drying, and the clear paint film on the upper portion of the beads, if any, is very thin. In a reflective plate, it has been conventional to expose the surface of beads directly to air, thereby securing the most excellent recurrent reflectivity when the refractive index of the beads is in the range from 1.9 to 2.1. It is also known that the reflected light is colored when the beads are soaked in the colored paint film.

The first feature of the present invention is to coat the colored paint by the use of such apparatuses as a roll coater, a curtain flow coater and a screen printer, ensuring a high productivity. The second feature of the invention is to arrange the beads compactly in a single layer on the intermediate paint layer under the condition that the viscosity of the paint is the same as when coated, with no need of increasing its viscosity, for instance, by the use of semi-drying treatment. The third feature is that the beads do not adhere to the press machine in pressing the beads in the paint layer. The fourth feature is that a highly bright reflected light can be obtained in a wide angular range. Finally, the fifth feature is to completely prevent the falling off of the beads and the surface staining which are unavoidable in the conventional reflective plate, without any deterioration of the reflectivity.

Figure 3:
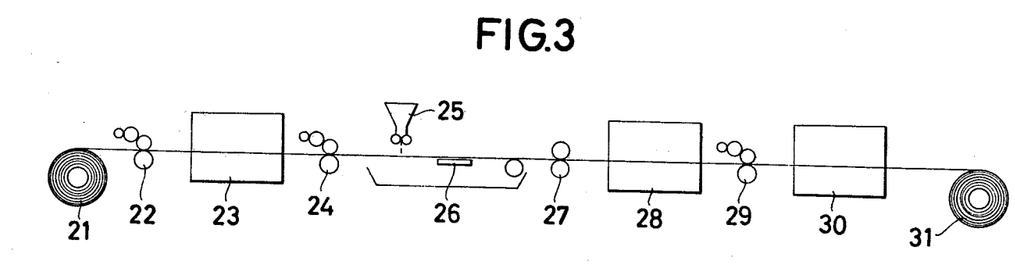
FIG. 3 is a schematic processing diagram for an example of the present invention.
Figure 4:
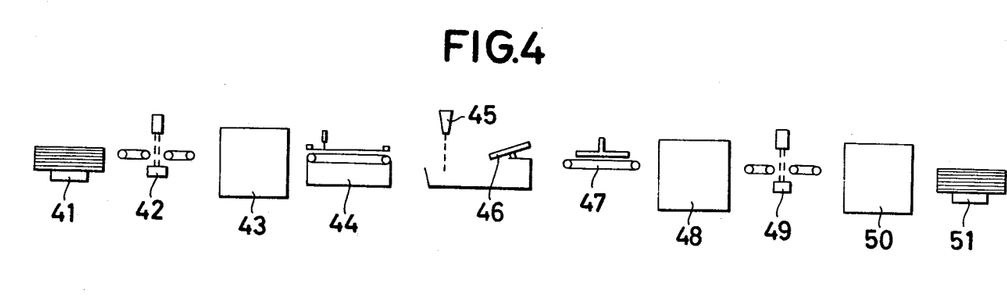
FIG. 4 is a schematic processing diagram for another example of the present invention.

The present inventive process having such features will be described practically according to FIGS. 3 and 4. FIG. 3 is a schematic processing diagram showing an example of the present process to be applied to a metal strip as a base plate, and FIG. 4 is a schematic processing diagram showing another example of the present process to be applied to a metal sheet or a plywood as a base plate. In FIG. 3, 21 is an uncoiler, 22 is a roller coater, 23 is a drying oven, 24 is a roll coater, 25 is a scattering apparatus for beads, 26 is a vibrator, 27 is a pinch roller, 28 is a drying oven, 29 is a roll coater, 30 is a drying oven and 31 is a recoiler. In FIG. 4, 41 is a sheet feeder, 42 is a curtain flow coater, 43 is a drying oven, 44 is a plane screen printer, 45 is a scattering apparatus for beads, 46 is a vibrator, 47 is a press machine, 48 is a drying oven, 49 is a curtain flow coater, 50 is a drying oven and 51 is a sheet piler.

In FIG. 3, a strip is provided from uncoiler 21, its furface is coated with a colored paint by roll coater 22, and the thus treated strip is dried by drying oven 23 to obtain a primary colored layer. A colored paint with the same color as the primary colored layer is coated thereon by roll coater 24 to form an intermediate colored layer. Glass beads are scattered on the intermediate layer immediately with no drying by scattering apparatus 25, and the excess of beads unadhered on said layer are removed by vibrator 26. The remaining beads are forcedly pressed in the intermediate colored layer by pinch roll 27, and the strip is put in drying oven 28 to dry the paint to obtain an intermediate colored layer. Finally, a clear paint is coated thereon by roll coater 29, the strip is put in drying oven 30 to dry and cure the clear paint and is coiled by recoiler 31.

In FIG. 4, a base plate is provided from sheet feeder 41, its surface is coated with a colored paint by curtain flow coater 42, and the thus obtained plate is dried by drying oven 43 to obtain a primary colored layer. A colored paint is printed thereon by plane screen printer 44 to form an intermediate colored layer. Glass beads are scattered on the intermediate layer immediately with no drying by scattering apparatus 45, and the excess of beads unadhered on said layer are removed by a vibrator 46. The remaining beads are forcedly pressed in the intermediate layer by a press machine 47, and the plate is put in drying oven 48 to dry the paint to obtain an intermediate colored layer. Finally, a clear paint is coated thereon by curtain flow coater 49, the plate is treated in drying oven 50 to dry and cure the clear paint and is piled by sheet piler 51.

Now, the features in each of the processing steps will be described in detail hereinbelow.

As a providing apparatus of the base plate, such apparatuses as a sheet feeder and an uncoiler are suitable in general, depending of course on whether the base plate is in the shape of a sheet or a strip.

The step of forming a colored layer on the base plate has an important role in the present invention. The reason why a primary colored layer is formed is, in the first place, to color the base plate for the purpose of displaying letters and figures to be printed on the plate, as in signboards; in the second place, to protect the surface of the base plate from rusting when the base plate comprises a corrosive metal such as a steel plate; thirdly to render the surface of the base plate smooth when the surface of the base plate is rough and hygroscopic such as in the case of a plywood; and finally to prevent the lowering of the brightness of reflected light which occurs in observing the reflective plate having no colored layer from the front because the beads are pressed down to the bottom of the intermediate colored layer.

On the other hand, if the base plate is a bright-finished base plate, then it is not necessary to form the primary colored layer on the base plate.

As a colored paint to form a primary colored layer, any high speed drying type can be applied so long as the paint has a sufficient adhesion property to the base plate. For better exterior durability in the outdoor use and the fabricability, such types as epoxy resin, alkyd resin, acrylic resin, polyester resin, poly-vinyl chloride resin and polyurethane resin are recommendable. The thickness of the primary colored layer is usually from 3 to 30 microns (after drying), varying depending on the kind of paint and the economic aspect.

The step of drying the colored paint to form a primary colored layer has no particular feature. The use of an infrared ray drying oven and a combustion air drying oven is recommendable in general, although the apparatus and the drying condition is to be selected according to the kind of paint. An ultraviolet ray curing apparatus and an electron beam curing apparatus may also be applied in some instances according to the kind of paint. Whether complete drying or semi drying is done is determined according to the kind of colored paint to form an intermediate colored layer in the subsequent step.

The thickness of the layer in the next step of coating or printing a paint to form an intermediate colored layer is a very important factor in the present invention. Based on the consideration that it will be sufficient, for the purpose of preventing overlapping of beads in two or more layers when scattering the beads on a paint layer having a low viscosity, to control the thickness of the paint layer so that the paint which oozes out through the cavities among the beads does not reach the vicinity of the top of the beads in the first layer, the present inventors thoroughly investigated the relationship between the size of beads and the thickness of the intermediate colored layer.

The correlation between the size of beads and the paint layer thickness before and after the scattering of beads thereon was calculated theoretically in the first place under the assumption that the beads are completely spherical and the beads are arranged in a single layer. The correlation will be explained according to FIGS. 5 and 6.

Figure 5A:
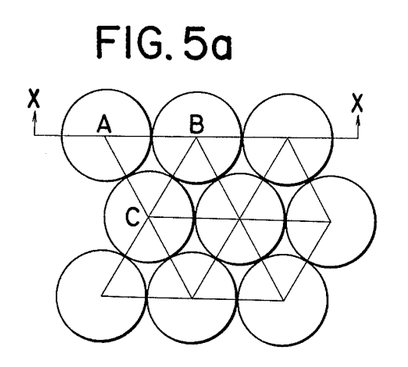
FIG. 5(a) is a plan view of a single layer of beads scattered on a paint layer.
Figure 5B:
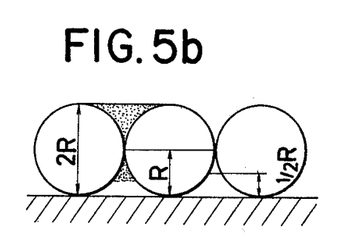
FIG. 5(b) is a sectional view along X—X of FIG. 5(a).

FIG. 5(a) is a schematic plane state diagram when the beads are scattered so as to be closest to each other in a single layer on the surface of a paint layer, and FIG. 5(b) is the sectional diagram thereof along X—X in (a). Supposing the mean radius of beads is R, the layer thickness before the scattering of beads is $T_1$ and the paint layer thickness after the scattering of beads is 2R (i.e. the beads are soaked just completely in one layer in the paint layer), then the correlation between R and $T_1$ is calculated from the triangle ABC as follows:

$$T_1 = (2 - \frac{2\pi}{3\sqrt{3}}) R \text{ or } T_1 \approx 0.79 R$$

Similarly, the correlation when the paint layer thickness after the scattering of beads is $\frac{1}{2}$ R (i.e. when the beads are soaked up to a depth $\frac{1}{4}$ of the mean diameter) is calculated to be:

$$T_1 = \frac{24\sqrt{3} - 5\pi}{48\sqrt{3}} R \text{ or } T_1 \approx 0.31 R$$

Figure 6A:
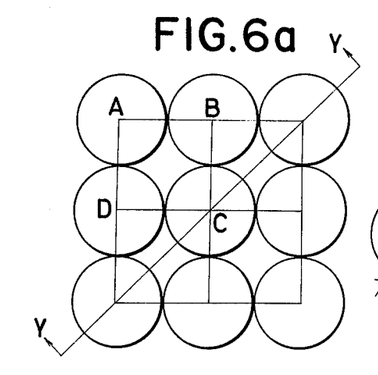
FIG. 6(a) is a plan view of another single layer of beads scattered on a paint layer.
Figure 6B:
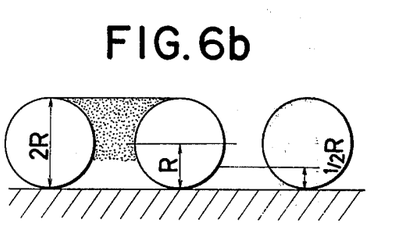
FIG. 6(b) is a sectional view along Y—Y of FIG. 6(a).

FIG. 6(a) is a plane state diagram when the beads are scattered somewhat roughly (as a true square) in a single layer on the surface of a paint layer, and FIG. 6(b) is the sectional diagram thereof along Y—Y in (a). When the paint layer thickness after the scattering of beads is 2R (i.e. when the beads are soaked just completely in one layer), the correlation between the mean radius of beads, R, and the layer thickness before the scattering of beads, $T_2$, is calculated to be:

$$T_2 = (2 - \frac{\pi}{3}) R \text{ or } T_2 \approx 0.95 R$$

Similarly, when the paint layer thickness after the scattering of beads is $\frac{1}{2}$ R (i.e. when the beads are soaked up to a depth $\frac{1}{4}$ of the mean diameter), the correlation between R and $T_2$ is calculated to be:

$$T_2 = \frac{48 - 5\pi}{96} R \text{ or } T_2 \approx 0.34 R$$

However, it was ascertained from the results of various experiments that the closest relationship as in FIG. 5(a) could not be expected for practical scattering, and that the state obtained is that of FIG. 6(a), or still rougher.

Based on the calculated values as above mentioned, the present inventors studied, through experiments, the maximum paint layer thickness, at which the beads could be arranged on a paint layer in a single layer with no overlapping and at which the beads do not adhere to the press machine in the next step of pressing the beads, by changing the size of beads and the paint layer thickness before the scattering of beads. It was ascertained that the value was about less than 100% of the mean radius of beads irrespective of the size of beads. However, since the beads are exposed only a little when the layer thickness reaches to 100%, decreasing the angular stretch of the reflected light, it is concluded the value should be limited within 80% of the mean radius of beads.

Then the present inventors studied the minimum paint layer thickness at which a colored reflected light with a broad angle could be obtained, and it was found that the paint thickness was necessarily more than 30% of the mean radius of the beads, corresponding to the condition that the beads were soaked in the paint layer up to the depth about $\frac{1}{4}$ of the mean diameter of the beads in the above mentioned calculation.

For the reason as above mentioned, the paint to form an intermediate layer is coated or printed on the primary colored layer so that the thickness of the intermediate colored layer becomes in the range from 30 to 80% of the mean radius of the beads. Under the circumstances, the paint may be coated partially on the primary colored layer to paint patterns such as letters and figures as shown in Example 2 hereinafter. It is desirous that the colored paint to form an intermediate colored layer satisfies the same condition as in the case of the paint to form the primary colored layer as above mentioned, and that it also has an excellent adhesion property to the primary colored layer.

The color tone of the primary and the intermediate colored layers is selected in accordance with the use. The paint containing a metal pigment such as aluminium flake has the most excellent reflectivity, and the reflectivity decreases in the order of a light colored paint such as white, a medium colored paint and a dark colored paint. Therefore, the use of a silver colored or light colored paint is desirous in order to obtain an excellent reflectivity. When the reflectivity of the base plate itself is excellent as in the case of a bright-finished aluminum plate, a chromium-plated steel plate, or a chromium- or aluminum-coated plastic sheet, for example, it is desirous to use a highly transparent colored paint to utilize the reflectivity of the base plate effectively. In this instance, further, the one in which the base plate is coated directly with an intermediate colored layer with no use of a primary colored layer gives a higher reflectivity than the one with a primary colored layer.

In the next step, the scattering of beads, an apparatus to scatter beads on the surface of the intermediate colored layer and an apparatus to remove the excess of beads unadhered thereon are needed. As a scattering apparatus, the combination of a usual hopper with a vibrator or a supply roll is suitable. It is desirous that the scattering amount can be controlled in accordance with the passing speed of the base plate. To remove the excess of beads, such methods as sweeping off the beads with a vibrator and sucking out the beads under vacuum may be adopted, but the use of the former gives practically advantageous results.

The next step of pressing the beads in the intermediate colored layer is an important feature of the present invention. The reason why the beads are forcedly pressed in is that the procedure has such merits that the surface of the intermediate layer is smoothed by pressing the beads, previously adhered only shallow on the surface thereof, surely in the layer to facilitate and render uniform the coating of the layer with a clear paint in the subsequent step, the falling off and staining of the beads are prevented to continuously maintain a high reflectivity in the outdoor environment, and the angle of reflection is enlarged. Roll-type and press-type apparatuses may be used for the pressing in of beads, but a roll-type apparatus is recommendable when the plate is a strip. It is important therein that the roll rotates in synchronism with the speed of the base plate with no slipping. Metal, rubber, synthetic resin and the like are suitable as a surface material of the roll to contact with beads. Rubber and synthetic resin are more compatible with the base plate than metal, but metal gives a surer result in pressing in. Similar materials are recommendable for the surface material of the press machine. In using a press machine, there is no problem of slipping because the operation is done intermittently by stopping the base plate, but its productivity is low.

The drying process of the paint to form an intermediate colored layer is done by using an apparatus quite the same as in the formation of the primary colored layer as above mentioned.

The filling up of the cavities among beads in the step of coating a clear paint is a very important feature of the present invention. It is the present inventors' idea to fill up the cavities among beads with a clear paint in a manner which results in exposing the upper portion of the beads directly to air, for the purpose of avoiding the falling off and the staining of beads most effectively. The cavities among beads are filled up with a clear paint in a manner which results in preventing the adhesion of the paint on the surface of the upper portion of beads as far as possible, in order to fix the beads firmly in the paint layer and simultaneously to prevent the intrusion of stains in the cavities among the beads on one hand, and to increase the reflectivity due to the exposure of the beads to the atmospheric air on the other hand.

What is most important in this step is the amount of the clear paint to be coated. The cavities among beads are not filled up sufficiently when the amount is small, and the beads are buried in the paint deeply to deteriorate the reflectivity when the amount is too large. After the result of various experiments by the present inventors, it is ascertained that the most suitable condition is to fill up the cavities among beads with a clear paint so that the beads are buried in the intermediate and the clear paint layers to a depth in the range from 40 to 80% of the mean diameter of the beads in total after drying.

When the total depth of the intermediate and the clear paints in which the beads are to be buried is less than 40% of the mean diameter of the beads, the amount of the clear paint is too small, and not only will the beads fall off in the subsequent working processes but also the surface of the plate is stained. On the other hand, when said value is more than 80%, the thickness of the clear paint on the surface of the exposed portion of the beads reaches up to several microns after drying, deteriorating the reflectivity extremely. When said value is in the range from 40 to 80%, the beads do not fall off and the thickness of the clear paint on the surface of the exposed portion of the beads after drying is negligible, with almost no deterioration of the reflectivity.

The importance of the amount of the clear paint will be explained according to the following experimental results.

(1) Experimental conditions:
1. Base plate: Galvanized steel plate, plate thickness 0.5 mm.

| 2. Primary colored layer: | Resin Polyester |
| --- | --- |
| | Color Silver color |
| | Dried film thickness 10 microns |

| 3. Intermediate colored layer: | Resin Polyester |
| --- | --- |
| | Color Silver color |
| | Thickness 12 microns |
| | Non-volatile contents 50% (in volume) |
| | Dried film thickness 6 microns |

| 4. Glass beads: | Mean radius 40 microns |
| --- | --- |
| | Refractive index 1.9 |

| 5. Coating condition of clear paint: | |
| --- | --- |
| No.1 | Resin Polyurethane |
| | Refractive index 1.42 |
| No.2 | Resin Polyester |
| | Refractive index 1.53 |
| Depth of beads buried in the paint (in terms of percentage of the mean diameter of beads after drying) | |
| 20%, 30%, 40%, 50%, 60%, 70%, 80%, 90% and 100% (beads are completely buried) | |

6. Testing methods:
 Fabricability:
 (1) Peeling test with a tape after OT bending, 180°, with a vise
 (2) Peeling test with a tape after $1^R$ bending, 90°, with a nine stage roll forming machine
 (3) Cylinder drawing test with a depth of $40\phi \times 30$ mm., radius of tip of the die: 4 mm
 Stain resistance: To stain with an oil ink (red), and to mop up with a soft cloth, which had been immersed in alcohol, after 24 hours 6. Drying condition of paint to form the intermediate colored layer:
   Drying condition . . . 250° C. for 45 sec.
   Plate passing speed in drying oven . . . 30 m/min.
7. Coating condition of clear paint:
   Resin . . . Polyester
   Refractive index . . . 1.42
   Viscosity . . . 50 sec. by #4 Ford cup test (diluted with a solvent)
   Method of coating . . . Natural coating
   Depth of beads buried in paint (in terms of percentage of the mean diameter of beads after drying) . . . 45–50%
   Drying condition . . . 250° C. for 30 sec.
   Plate passing speed in drying oven . . . 30 m/min.
8. Manufacturing process: Cf. FIG. 3
9. Result: As shown in Table 1

EXAMPLE 2

1. Base plate: Plywood, plate thickness 6 mm.
2. Coating condition of paint to form a primary colored layer:
   Resin . . . Polyester
   Color . . . White
   Viscosity . . . 60 sec. by #4 Ford cup test
   Method of coating . . . Curtain flow coating
   Layer thickness . . . 100–120 microns after drying
   Drying condition . . . 120° C. for 5 min.
   Plate passing speed in drying oven . . . 5 m/min.
3. Coating condition of paint to form an intermediate layer:
   Resin . . . Alkyd
   Color . . . Reddish white
   Pattern . . . Figure
   Viscosity . . . 12,000 centipoises
   Method of printing . . . Plane screen printing
   Screen mesh . . . 100 meshes
   Layer thickness . . . 75 microns as an undried film
4. Glass beads:
   Means radius . . . about 100 microns
   Refractive index . . . 2.1
5. Pressing in of beads:
   Pressed by a metal plate having a hard chromium plated surface
6. Drying condition of paint to form the intermediate layer:
   Drying condition . . . 150° C. for 5 min.
   Plate passing speed in drying oven . . . 5 m/min.
7. Coating condition of clear paint:
   Resin . . . Polyurethane
   Refractive index . . . 1.53
   Viscosity . . . 180 sec. by #4 Ford cup test (diluted with a solvent)
   Method of coating . . . Curtain flow coating
   Depth of beads buried . . . 75–80% of the mean diameter of beads
8. Manufacturing process: Cf. FIG. 4
9. Result: As shown in Table 1.

TABLE 1

| Article | | | Example 1 Silver white | Example 2 Reddish white, pattern portion | Comparison White reflective sheet | JIS Z 9114 Standard First grade, white |
|---|---|---|---|---|---|---|
| | Observation angle (°) | Incidence angle (°) | | | | |
| Reflectivity | 0.2 | −4 | 150 | 18 | 85 | 70 |
| | 0.2 | 30 | 31 | 9 | 42 | 30 |
| | 0.2 | 50 | 11 | 2 | 5 | 3.5 |
| Fabricability | OT bending, 180° | | No falling off of beads | — | Film partially cracked | — |
| | 1$^R$ bending, 90° | | No falling off of beads | — | Film partially cracked | — |
| | Cylinder drawing, 40φ × 30 mm. | | No falling off of beads | — | Film partially cracked | — |
| Stain resistance, Mop up oil ink after 24 hrs. | | | No stain | No stain | No stain | — |

As above described, the present invention can produce a colored reflecting plate having excellent durability and fabricability in the form of a structural body in itself by using a base plate such as a metal plate and a plywood contrary to the prior arts, in which only a reflective sheet in the form of a thin sheet can be obtained, economically with a high productivity.

The colored reflective plate having excellent durability and fabricability produced by the present method can be applied not only for the use of signboards and marks in general, but also for processing to obtain caps of guard rails, electric pole covers, corner portions of fences, shutters, wheel covers and plate numbers of automobiles and so on. Thus, the present inventive product has various uses with high advantages.

What is claimed is:

1. A method for producing a colored reflective plate comprising coating a colored paint on a base plate to form a primary colored layer, coating or printing a colored paint on said primary colored layer to form an intermediate colored layer in a thickness in a range from 30 to 80% of the mean radius of glass beads to be coated subsequently thereon, scattering glass beads having a refractive index in a range from 1.9 to 2.1 on the surface of said intermediate colored layer, removing the excess of glass beads unadhered on said intermediate colored layer, pressing the remaining glass beads in said intermediate colored layer until said beads contact said primary colored layer, drying said intermediate colored layer, coating a clear paint in the cavities among said glass beads so as to bury said glass beads in said interme- (2) Result:

| Depth of beads buried in the paint (per mean radius) | Reflectivity | | | | Fabricability | | | | | | Stain resistivity | |
|---|---|---|---|---|---|---|---|---|---|---|---|---|
| | Observation angle (°) | Incidence angle (°) | Reflectivity Coating condition No. 1 | Coating condition No. 2 | OT bending test, 180° | | $1^R$ bending test, 90° | | Cylinder drawing test | | | |
| | | | | | Cond. No.1 | Cond. No.2 | Cond. No.1 | Cond. No.2 | Cond. No.1 | Cond. No.2 | Cond. No.1 | Cond. No.2 |
| No clear paint coating (comparison) | 0.2 | −4<br>30<br>50 | 160<br>35<br>15 | | 1 | | 2 | | 1 | | X | |
| 20% | 0.2 | −4<br>30<br>50 | 157<br>34<br>13 | 156<br>34<br>12 | 2 | 2 | 3 | 3 | 3 | 2 | X | X |
| 30% | 0.2 | −4<br>30<br>50 | 155<br>32<br>12 | 155<br>31<br>11 | 3 | 3 | 4 | 4 | 3 | 3 | △ | △ |
| 40% | 0.2 | −4<br>30<br>50 | 154<br>32<br>11 | 153<br>31<br>10 | 4 | 4 | 5 | 5 | 4 | 4 | ○ | ○ |
| 50% | 0.2 | −4<br>30<br>50 | 151<br>31<br>10 | 152<br>30<br>10 | 5 | 5 | 5 | 5 | 5 | 5 | ○ | ○ |
| 60% | 0.2 | −4<br>30<br>50 | 149<br>30<br>6.2 | 150<br>30<br>8.7 | 5 | 5 | 5 | 5 | 5 | 5 | ◎ | ◎ |
| 70% | 0.2 | −4<br>30<br>50 | 138<br>27<br>5.4 | 133<br>28<br>7.5 | 5 | 5 | 5 | 5 | 5 | 5 | ◎ | ◎ |
| 80% | 0.2 | −4<br>30<br>50 | 124<br>19<br>3.8 | 126<br>21<br>5.6 | 5 | 5 | 5 | 5 | 5 | 5 | ◎ | ◎ |
| 90% | 0.2 | −4<br>30<br>50 | 17<br>0.3<br>0.1 | 15<br>0.2<br>0.1 | 5 | 5 | 5 | 5 | 5 | 5 | ◎ | ◎ |
| 100% | 0.2 | −4<br>30<br>50 | 4.5<br>0.1<br>0.05 | 4.2<br>0.1<br>0.05 | 5 | 5 | 5 | 5 | 5 | 5 | ◎ | ◎ |

Evaluation of fabricability:
1 More than 80% of the beads fell off.
2 More than 40% of the beads fell off.
3 More than 10% of the beads fell off.
4 Beads fell off slightly.
5 Entirely no beads fell off.
Evaluation of stain resistance
◎ Entirely no stain was remaining.
○ Stains were remaining very slightly.
△ Stains were remaining a little.
X Stains were remaining largely.

As obvious from the above mentioned experimental result, the fabricability and durability of a reflective plate can be improved without deteriorating the reflectivity, irrespective of the refractive index of the clear paint, by coating a clear paint on the cavities among the beads so that the beads are buried in said intermediate and clear paint layers to a depth in the range from 40 to 80% of the mean diameter of the beads in total after drying. It is desirous to apply a clear paint with a viscosity within 200 seconds by the #4 Ford cup test with the use of a solvent, and a higher viscosity is harmful to the productivity because the setting time of the paint is prolonged due to the accumulation of the paint in the cavities among the beads. The clear paint desirably has properties similar to the colored paint which forms the intermediate colored layer, and simultaneously has good adhesion property to the intermediate colored layer.

The drying step of the clear paint layer is done as in the steps of drying the primary and the intermediate colored layers. In the final step of receiving the finished plate, the use of a usual sheet piler or a recoiler is suitable, depending on the shape of the plate.

Now, practical embodiments of the invention will be described according to the examples in the following.

EXAMPLE 1

1. Base plate: Galvanized steel plate, plate thickness 0.5 mm.
2. Coating condition of colored paint to form a primary colored layer:
   Resin . . . Polyester
   Color . . . Silver white
   Viscosity . . . 120 sec. by #4 Ford cup test
   Method of coating . . . Reverse roll coating
   Layer thickness . . . 10–12 microns after drying
   Drying condition . . . 250° C. for 30 sec.
   Plate passing speed in drying oven . . . 30 m/min.
3. Coating condition of colored paint to form an intermediate colored layer:
   Resin . . . Polyester
   Color . . . Silver white
   Viscosity . . . 180 sec. by #4 Ford cup test
   Method of coating . . . Reverse roll coating
   Layer thickness: 12–14 microns as an undried film
4. Glass beads:
   Mean radius . . . about 40 microns
   Refractive index . . . 1.9
5. Pressing in of beads:
   Pinched with a metal roll diate colored layer and said clear paint up to a depth from 40 to 80% of the mean diameter of said beads as calculated in the dried condition, and drying and curing said clear paint.

2. A method according to claim 1 in which the base plate is selected from the group consisting of a steel plate, an aluminum plate and a plywood.

3. A method according to claim 1 in which the colored paints for forming the primary and intermediate colored layers are selected from the group consisting of epoxy resin paint, alkyd resin paint, acrylic resin paint, polyester resin paint, poly-vinyl chloride resin paint and polyurethane resin paint.

4. A method for producing a colored reflective plate comprising coating a transparent colored paint on a bright-finished base plate to form a colored layer in a thickness in a range from 30 to 80% of the mean radius of glass beads to be coated subsequently thereon, scattering glass beads having a refractive index in a range from 1.9 to 2.1 on the surface of said colored layer, removing the excess of glass beads unadhered on said colored layer, pressing the remaining glass beads in said colored layer until said beads contact said base plate, drying said colored layer, coating a clear paint in the cavities among said glass beads so as to bury said glass beads in said colored layer and said clear paint up to a depth from 40 to 80% of the mean diameter of said beads as calculated in the dried condition, and drying and curing said clear paint.

5. A method according to claim 4 in which the base plate is selected from the group consisting of a bright-finished aluminum plate, a chromium-plated steel plate, a chromium-coated plastic sheet and an aluminum-coated plastic sheet.

6. A method according to claim 5 in which the base plate is a bright-finished aluminum plate.

* * * * *